United States Patent [19]

Nozawa et al.

[11] Patent Number: 4,554,497
[45] Date of Patent: Nov. 19, 1985

[54] ACCELERATION/DECELERATION CIRCUIT

[75] Inventors: Ryoichiro Nozawa; Hideaki Kawamura; Takao Sasaki, all of Tokyo, Japan

[73] Assignee: Fanuc Ltd., Hino, Japan

[21] Appl. No.: 610,983

[22] PCT Filed: Sep. 30, 1983

[86] PCT No.: PCT/JP83/00326
§ 371 Date: May 14, 1984
§ 102(e) Date: May 14, 1984

[87] PCT Pub. No.: WO84/01444
PCT Pub. Date: Apr. 12, 1984

[30] Foreign Application Priority Data
Oct. 1, 1982 [JP] Japan .................... 57-172863

[51] Int. Cl.[4] .............................. G05B 21/02
[52] U.S. Cl. .................... 318/636; 318/561; 318/571; 318/616; 364/178
[58] Field of Search ............ 318/636, 616, 618, 571, 318/573, 561, 415; 364/148, 178; 328/30

[56] References Cited

U.S. PATENT DOCUMENTS 3,838,325  9/1974  Kobayashi ................ 318/415
4,357,664 11/1982  Imazeki et al. ........... 318/571 X
4,368,433  1/1983  Imazeki ..................... 328/30
4,486,693 12/1984  Hamati et al. ............. 318/561
4,488,098 12/1984  Shimonou ................... 318/561

*Primary Examiner*—B. Dobeck
*Attorney, Agent, or Firm*—Staas & Halsey

[57] ABSTRACT

An acceleration/deceleration circuit for raising or lowering a feed velocity, in order to achieve a commanded velocity, over a prescribed time constant irrespective of the magnitude of a change in velocity. The acceleration/deceleration circuit includes means (301) for computing a traveling distance along each axis every sampling period (T), a first storage section (#1 through #n) for storing n samplings of traveling distance components along each axis, a second storage section SUM for storing results of computation, and an arithmetic section (ADD, ACC, DIV) for performing an operation:

$$\Delta Xn - \Delta Xo + St \to St$$

where $\Delta Xn$ represents the latest sampled traveling distance component, $\Delta Xo$ represents the oldest sampled traveling distance component among the traveling distance components stored in the first storage section, and St represents the contents of the second storage section, and for dividing the result St by n, wherein the result St is stored in the second storage section, and St/n is output as a traveling distance component at a present sampling instant.

10 Claims, 17 Drawing Figures

ACCELERATION/DECELERATION CIRCUIT

BACKGROUND OF THE INVENTION

This invention relates to an acceleration/deceleration circuit and, more particularly, to an acceleration/deceleration circuit well-suited for driving, e.g., a moveable element of a machine tool or a hand of a robot.

In a control unit for controlling travel along the axes of a machine tool, a robot or the like, acceleration and deceleration generally are carried out so that the mechanical system will not be subjected to shock or vibration when starting and slowing down axial travel. Two of such acceleration/deceleration methods, described hereinbelow, are available. Though the case to be described relates to linear interpolation along two, i.e., X and Y axes, operation is entirely the same for cases where there are more than two axes and for circular interpolation, etc. Further, we shall let T represent a sampling period, F a commanded feed velocity, X a traveling distance along the X axis, Y a traveling distance along the Y axis, and S $(=\sqrt{X^2+Y^2})$ a traveling distance along a tangential direction.

The first acceleration/deceleration method comprises performing coarse interpolation in a coarse interpolator by obtaining a minute traveling distance component $\Delta S$ using the operation $\Delta S = F \cdot T$ performed every sampling period T, and by obtaining traveling distance components $\Delta X$, $\Delta Y$ along the X and Y axes using $\Delta S$ and the following equations:

$$\Delta X = \Delta S \cdot \frac{X}{\sqrt{X^2+Y^2}} \quad (1)$$

$$\Delta Y = \Delta S \cdot \frac{Y}{\sqrt{X^2+Y^2}} \quad (2)$$

These calulations are followed by performing acceleration and deceleration, with independent delays along the axes with respect to $\Delta X$ and $\Delta Y$. FIG. 1 is a block diagram of a control apparatus to which the first acceleration/deceleration method is applied. A coarse interpolator 101 uses the feed velocity F and the traveling distances X, Y along the X and Y axes to compute coarse interpolation data $\Delta X$, $\Delta Y$ from Eqs. (1) and (2), and applies the data $\Delta X$, $\Delta Y$ to pulse distributors 102X, 102Y, respectively. The pulse distributors 102X, 102Y, which serve as fine interpolators, perform a pulse distributing operation based on the coarse interpolation data $\Delta X$, $\Delta Y$ to generate distributed pulses XP, YP the number of pulses generated corresponds $\Delta X$, $\Delta Y$ during one sampling interval.

The distributed pulses XP, YP are applied to respective acceleration/deceleration circuits 103X, 103Y, disclosed in the specification of U.S. Pat. No. 3,838,325. Each of the acceleration/deceleration circuits 103X, 103Y has the construction shown in FIG. 3. This assumes that each performs acceleration and deceleration in exponential fashion, as depicted in FIG. 2, during rise time and decay time, respectively. In FIG. 3, numeral 3a denotes a synthesizing circuit for combining the distributed pulses XP (YP) produced by the pulse distributor 102X (102Y), and output pulses XCP (YCP) from the acceleration/deceleration circuit 103X (103Y). Numeral 3b denotes a register for storing the pulses produced by the synthesizing circuit 3a. Numeral 3c designates an accumulator, and 3d denotes an adder for adding the contents E of the register 3b and the contents of the accumulator 3c each time a pulse P is produced at a certain pulse rate Fc. The result of the adding operation is stored in the accumulator 3c. With F as the pulse rate of the distributed pulses XP, and with Fo as the pulse rate of the output pulses XCP, we having the following equations:

$$\frac{dE}{dt} = F - Fo \quad (3)$$

$$Fo = \frac{Fc}{2^n} \cdot E \quad (4)$$

where n represents the number of bits of the accumulator 3c. Equation change (3) represents the increment of the register 3b per time unit, and Eq. (4) expresses the number of carry pulses (output pulses XCP) produced by the accumulator 3c per time unit. Obtaining the output pulse rate Fo from Eqs. (3) and (4) gives us the following:

$$Fo = F[1 - \exp(-kt)] \quad (5)$$

where k is a constant. The output pulse rate Fo is accelerated exponentially at start-up and decelerated exponentially when the movable object is brought to rest.

Returning to FIG. 1, the output pulses XCP, YCP accelerated and decelerated exponentially by the acceleration/deceleration circuits 103X, 103Y are applied to servo circuits 104X, 104Y for driving servomotors 105X, 105Y, respectively. FIG. 4 illustrates the manner in which coarse interpolation is performed by the coarse interpolator 101.

The second acceleration/deceleration method involves performing acceleration and deceleration by applying acceleration and deceleration to the feed velocity input of an interpolator. FIG. 5 is a block diagram for practicing the second acceleration/deceleration method, and FIG. 6 illustrates the manner in which travel is performed. In FIG. 5, an acceleration/deceleration circuit 201 has a construction substantially the same as that shown in FIG. 3, the output pulses Fj of the circuit being accelerated and decelerated exponentially during the rise and decay of the feed velocity F, respectively. It should be noted that deceleration is performed automatically when the pulses indicative of the feed velocity F cease arriving. The time at which deceleration starts (the time at which input of pulses indicating the feed velocity F ceases) is the time at which a deceleration distance (already known) commensurate with the feed velocity F becomes equal to a remaining traveling distance Rm. An interpolator 202 performs a pulse distributing operation based on traveling distance data X, Y each time the output pulse Fj is generated by the acceleration/deceleration circuit 201. Based on this operation distributed pulses XP, YP are generated to drive servomotors 105X, 105Y through servo circuits 104X, 104Y. As a result, the output pulse rate (the traveling distance over one sampling interval) of the interpolator 202 is gradually increased and decreased at starting and stopping, points respectively, as illustrated in FIG. 6.

The first and second acceleration/deceleration methods are performed as described above. Of these two methods, the first is advantageous because the interpolator and acceleration/deceleration circuits have simple constructions. This is because the first method accomplishes acceleration/deceleration control entirely independently of interpolation, with acceleration and deceleration merely being performed when interpolation starts and ends, respectively. However, since there are independent delays along the respective axes, the first method is disadvantageous because the path which results from acceleration and deceleration develops an error, circular interpolation is performed as shown in FIG. 7. In FIG. 7, CCT represents a commanded circle, and ACT denotes the path following acceleration and deceleration. The radial error $\Delta R$ in FIG. 7 may be approximated by the following:

$$\Delta R \approx \tfrac{1}{2}\tau^2 \frac{F^2}{R} \quad (6)$$

where R represents the radius, $\tau$ a time constant and F a commanded velocity.

With the second acceleration/deceleration method, an advantage gained because there is absolutely no path error attributed to acceleration/deceleration control. However, considering that there is a change in the feed velocity, due to applying an override to the commanded feed velocity F, in order to end deceleration precisely at the given end point of travel, deceleration distance required in accordance with the feed velocity from moment to moment, as well as traveling distance remaining up to the end, must be known at all times. Therefore, the second method is disadvantageous because complex computations are necessary, meaning that the interpolator and acceleration/deceleration circuit are extremely complicated.

SUMMARY OF THE INVENTION

Accordingly, an object of the present invention is to provide a novel acceleration/deceleration circuit capable of reducing a path error and of realizing acceleration/deceleration control through a simple arrangement.

Another object of the present invention is to provide an acceleration/deceleration circuit capable of performing acceleration or deceleration to achieve a commanded velocity over a prescribed period of time irrespective of the magnitude of the change in velocity.

A further object of the present invention is to provide an acceleration/deceleration circuit wherein linear, exponential and any other acceleration/deceleration characteristic can be readily obtained.

Still another object of the present invention is to provide an acceleration/deceleration circuit wherein an acceleration/deceleration characteristic best suited for the characteristics of a servo loop can be readily set to make possible high-speed positioning and high-speed cutting.

The present invention is an acceleration/deceleration circuit for raising or lowering a feed velocity, in order to achieve a commanded velocity, over a prescribed time constant irrespective of the magnitude of change in velocity. A first acceleration/deceleration circuit according to the present invention includes means for computing a traveling distance along each axis every sampling period (T), a first storage section for storing n samplings of traveling distance components along each axis (where $n = \tau/T$), a second storage section for storing results of a computation, and an arithmetic section for performing an operation:

$$\Delta Xn - \Delta Xo + St \rightarrow St$$

where $\Delta Xn$ represents the latest traveling distance component, $\Delta Xo$ represents the oldest traveling distance component among the traveling distance components stored in the first storage section, and St represents the contents of the second storage section, and for dividing the result St by n, wherein the result St is stored in the second storage section, and St/n is output as a traveling distance component at a present sampling instant to perform linear acceleration/deceleration.

A second acceleration/deceleration circuit according to the present invention includes means for computing a traveling distance along each axis every sampling period (T), a storage section for storing n samplings of traveling distance components along each axis, and an arithmetic circuit for multiplying each of the n samplings of traveling distance component stored in the storage section by a corresponding set of coefficients, for adding the results of the multiplication operations, and for subsequently dividing the result of the addition by the sum of the coefficients, wherein the result of the division operation is output as a traveling distance component at a present sampling instant and any acceleration/deceleration characteristic can be attained by changing the coefficients.

DESCRIPTION OF THE PREFERRED EMBODIMENTS

The embodiments of the present invention will now be described in detail in conjunction with the drawings.

Figure 8:
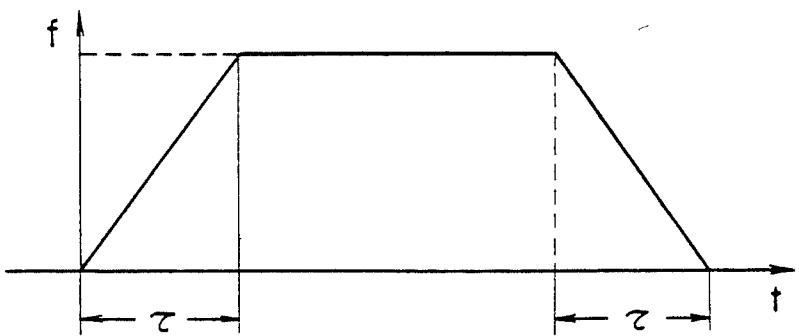
FIG. 8 linear-type acceleration/deceleration.

The present invention is directed to minimizing path error following acceleration/deceleration in circular interpolation, and to performing linear acceleration and deceleration, as shown in FIG. 8, over time intervals equivalent to a given time constant.

Figure 9:
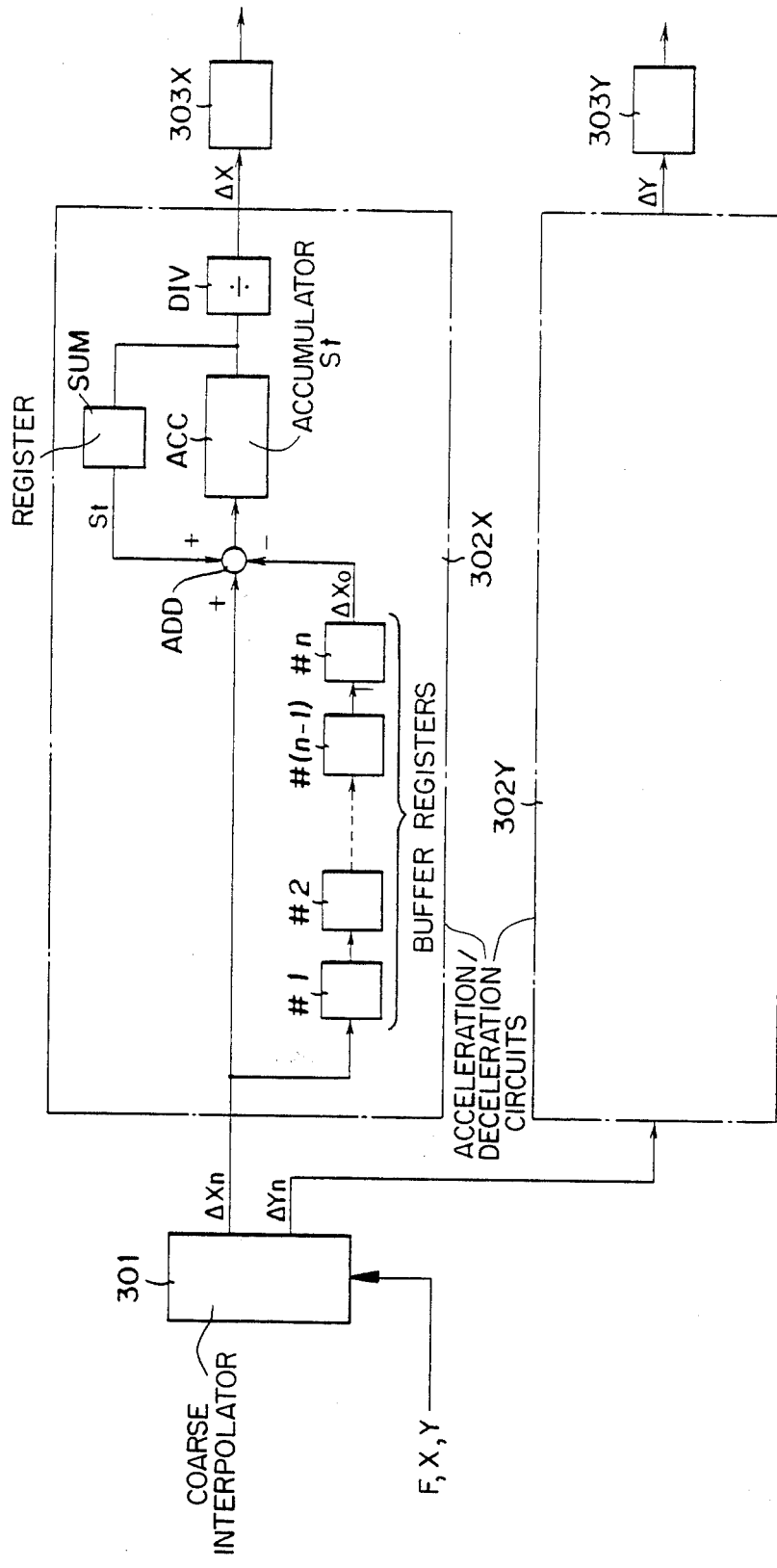
FIG. 9 is a block diagram of a first embodiment of the present invention.

FIG. 9 is a block diagram of first embodiment of the present invention, in which details are shown solely with regard to X-axis components. A coarse interpolator 301 performs the operations of Eqs. (1) and (2) to generate coarse interpolation data $\Delta Xn$, $\Delta Yn$ along the respective axes for every sampling. This data is applied to acceleration/deceleration circuits 302X, 302Y, respectively. Each of the acceleration/deceleration circuits 302X, 302Y includes: n buffer registers #1, #2 ... #(n−1), #n (where n is equivalent to $\tau/T$, with $\tau$ representing a time constant and T the sampling period); an adder ADD; an accumulator ACC for temporarily storing the results of addition; a register SUM to which the results of addition are transferred; and a divider DIV for dividing the results of addition by n. The registers #1 through #n are connected in series. With each sampling, the latest item of interpolation data $\Delta Xn$ is stored in buffer register #1, the contents of each buffer register is transferred to the succeeding buffer register, and the contents $\Delta Xo$ of the fiinal buffer register #n is applied as an input to the adder ADD. Thus the n buffer registers #1 through #n constitute an n-stage shift register.

Figure 12:
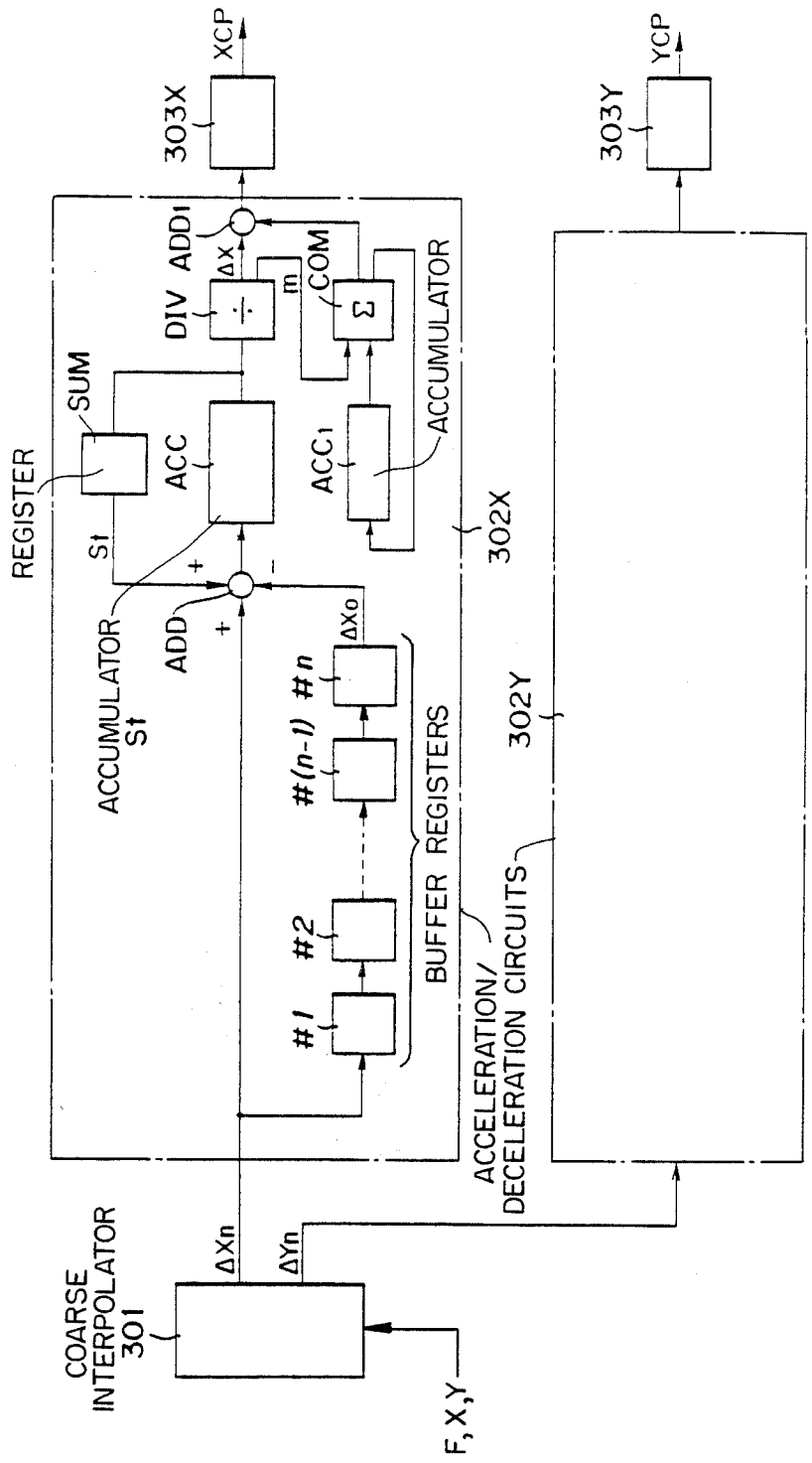
FIG. 12 illustrates a modification of the first embodiment.

At a certain sampling time, therefore, the adder ADD performs the operation:

$$\Delta Xn - \Delta Xo + St \rightarrow St \qquad (7)$$

where St is the contents of the register SUM, stores and the results of the addition in the accumulator ACC. The contents of the accumulator ACC is divided by n, by means of the divider DIV. The result $\Delta X$ is delivered as the output of the acceleration/deceleration circuit 302X, and applied to a pulse distributor 303X functioning as a fine interpolator. At the same time, the content of each buffer register (#1 through #n) is shifted to the succeeding buffer register, $\Delta Xn$ is stored in the first register #1, and the content St of the accumulator ACC is transferred to the register SUM. If there is a problem in terms of computation time in connection with the sequential shifting of the buffers, the shifting operation can be eliminated by providing a pointer indicating which buffer is to produce $\Delta Xo$ and which is to store $\Delta Xn$. Though not shown in FIG. 9, a separate accumulator $ACC_1$, adder $ADD_1$ and computing circuit COM can be provided, as illustrated in FIG. 12, provide for a remainder that may be produced by the division by n performed by the divider DIV. In such case, the computing circuit COM (see FIG. 12) sums a remainder m for each sampling period and the sum is accumulated in the accumulator ACC1. When the result of the addition exceeds n, 1 is added to the output value $\Delta X$ of the divider DIV and the resulting value is delivered as the output of the acceleration/deceleration circuit. Adopting this method makes highly precise acceleration and deceleration possible.

Figure 10A:
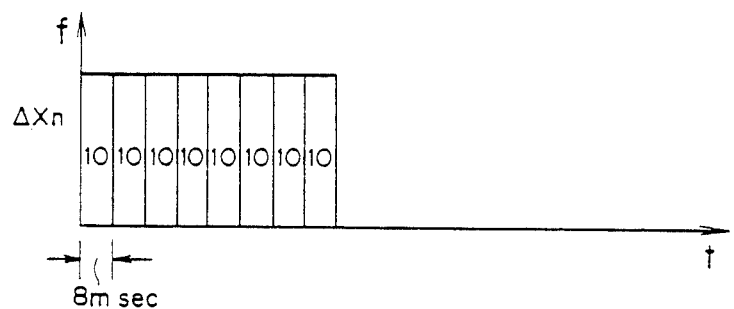
FIGS. 10A and 10B illustrate the first embodiment of the present invention.
Figure 10B:
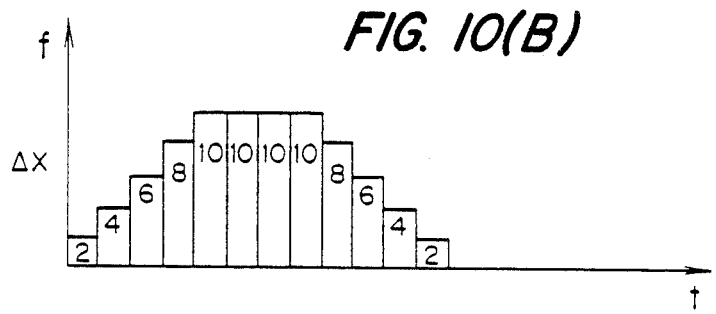

Next, a specific embodiment of the present invention will be illustrated with reference to FIG. 10. We shall assume that the time constant $\tau$ is 40 msec, and that the sampling period T is 8 msec. Accordingly, the number of buffer registers will be five (=40/8). Further, we shall assume that the input $\Delta Xn$ to the acceleration/deceleration circuit 302X is 10, and that the initial value in each of the buffer registers #1 through #10, accumulator ACC and register SUM is zero.

At the first sampling instant, the result St of performing Eq. (7) is 10 because $\Delta Xn=10$, $\Delta Xo=0$, and because the content of the register SUM is 0. Therefore, the output $\Delta X$ of the divider DIV is 2.

At the second sampling instant, the result St of performing Eq. (7) is 20 because $\Delta Xn=10$, $\Delta Xo=0$, and because the content of the register SUM is 10. Therefore, the output $\Delta X$ of the divider DIV is 4.

Thereafter, in similar fashion, the output $\Delta X$ of the divider increases to 6, 8 and 10, so that coincidence is achieved between the input $\Delta Xn$ (=10) to the acceleration/deceleration circuit 302X and $\Delta Xo$ (=10), this occuring upon passage of 40 msec, namely the time constant. The acceleration/deceleration circuit subsequently produces the numerical value 10 constantly until the arrival of $\Delta Xn$ ceases. When the latter occurs, the result St of performing Eq. (7) is 40 because $\Delta Xn=0$, $\Delta Xo=10$, and because the content of the register SUM is 50. Hence, the output $\Delta X$ of the divider DIV is 8. Thenceforth, through a similar operation, the divider output $\Delta X$ decreases to 6, 4, 2 and 0, with zero being reached upon passage of the time constant of 40 msec. Thus, according to the present invention, when there is a change in velocity, acceleration or deceleration is performed over the time constant $\tau$ irrespective of the magnitude of the change.

Figure 1:
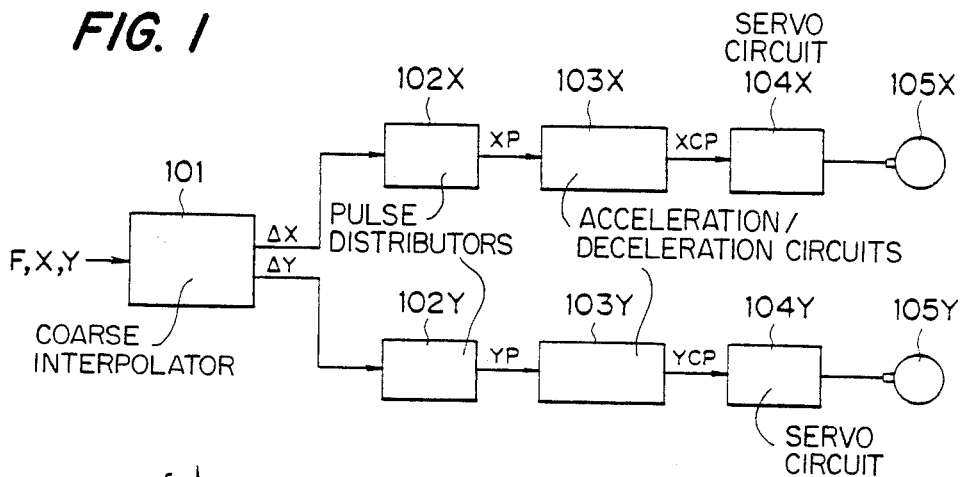
FIG. 1 is a block diagram of a first conventional acceleration/deceleration method.
Figure 2:
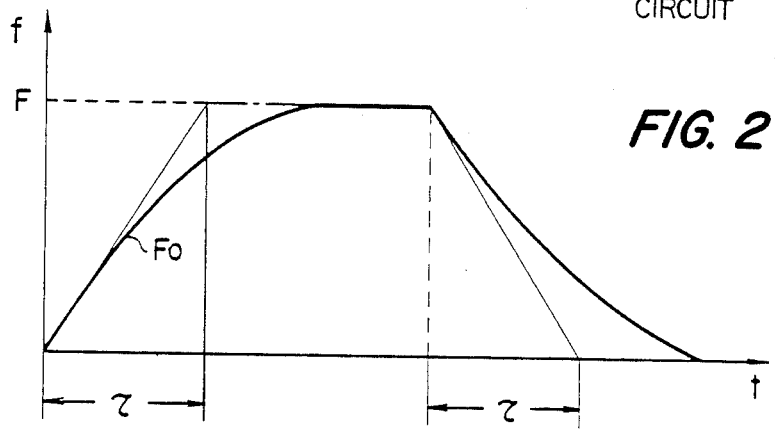
FIG. 2 illustrates exponential-type acceleration/deceleration.
Figure 3:
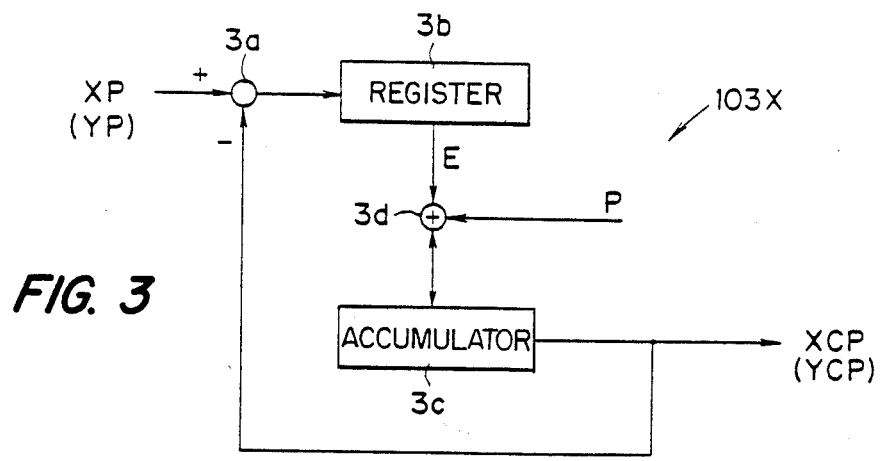
FIG. 3 is a block diagram of an exponential-type acceleration/deceleration circuit.
Figure 4:
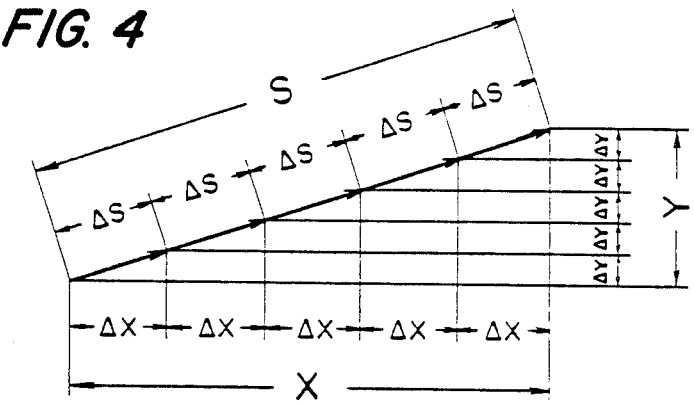
FIG. 4 illustrates the first acceleration/deceleration method.
Figure 5:
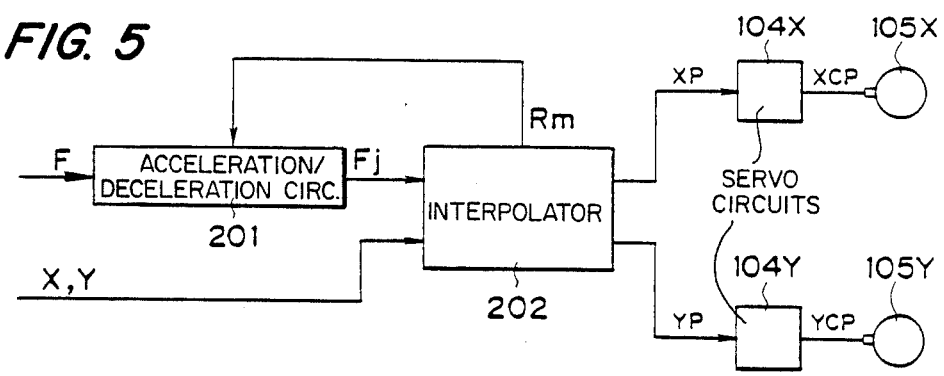
FIG. 5 is a block diagram of a second conventional acceleration/deceleration method.
Figure 7:
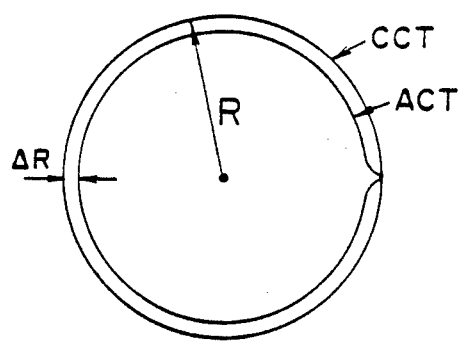
FIG. 7 path error caused by the first acceleration/deceleration method.
Figure 6:
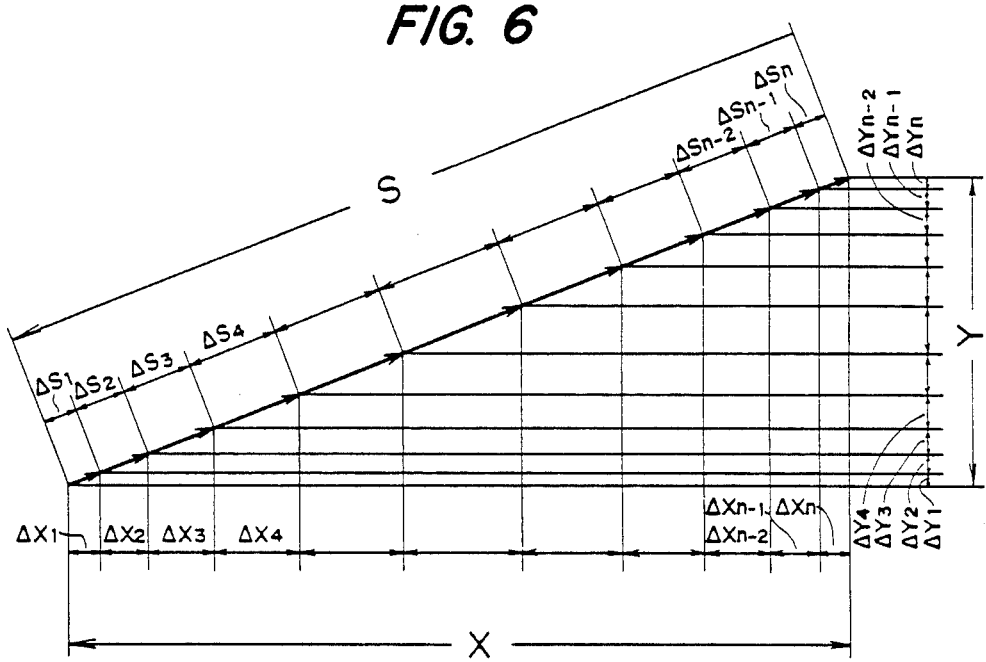
FIG. 6 illustrates the motion in the second acceleration/deceleration method.

Considered next is the path error occuring during circular interpolation for a case where a linear-type acceleration/deceleration circuit according to the present invention is applied to the acceleration/deceleration method of FIG. 1.

Figure 11:
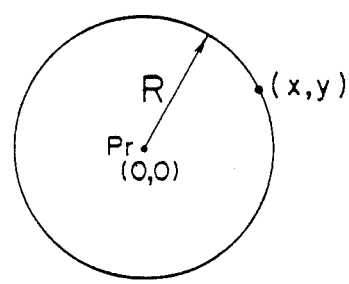
FIG. 11 illustrates the path error occuring in the present invention.

A point of an arc and the tangential velocity at the point are found from the following equations, where the center of the arc is taken as a reference point Pr, as shown in FIG. 11:

$$x = R \cos \omega t \qquad (8)$$

$$y = R \sin \omega t \qquad (9)$$

$$Fx = -\omega R \sin \omega t \qquad (10)$$

$$Fy = -\omega R \cos \omega t \qquad (11)$$

where $\omega$ represents angular velocity.

In linear acceleration/deceleration control according to the present invention, the output value produced by the acceleration/deceleration circuit at a certain time t is obtained by dividing the total of the input values from time $t-\tau$ to time t by $\tau$, assuming that the time constant $\tau$ and sampling period T have the same units. Though the output value of the acceleration/deceleration circuit is expressed in dimensions of distance, it may also be taken as velocity since the distance indicative of the output value is traveled during the sampling period T. Therefore, the output value of the acceleration/deceleration circuit can be thought of as being the total of the input values from time $t-\tau$ to time t divided by $\tau$.

Accordingly, with respect to the X axis, the X-axis feed velocity Fx produced by the acceleration/deceleration circuit is obtained from the following equation:

$$\begin{aligned} Fx &= \frac{1}{\tau} \int_{t-\tau}^{t} -\omega R \sin \omega t \, dt \\ &= \frac{R}{\tau} [\cos \omega t]_{t-\tau}^{t} \\ &= \frac{R}{\tau} \{\cos \omega t - \cos \omega(t-\tau)\} \\ &= \frac{R}{\tau} \left( -2\sin \frac{1}{2}(2\omega t - \omega t) \cdot \sin \frac{\omega t}{2} \right) \end{aligned} \qquad (12)$$

-continued $$= -\frac{2R}{\tau} \sin \frac{\omega t}{2} \sin\left(\omega t - \frac{\omega t}{2}\right)$$

$$= -K\sin\left(\omega t - \frac{\omega t}{2}\right)$$

where, $K = \frac{2R}{\tau} \sin \omega t$

Therefore, if we assume that a position along the X axis following acceleration or deceleration is X', then X' will be given by:

$$X' = \int FX \tag{13}$$

$$= -K \int \sin\left(\omega t - \frac{\omega t}{2}\right)$$

$$= \frac{K}{\omega} \cos\left(\omega t - \frac{\omega t}{2}\right)$$

If we let $R' = \frac{K}{\omega}$, then $\tag{14}$ $R = R - R'$ $$= R - \frac{2R}{\omega\tau} \sin \omega t$$

$$= R - \left[\frac{2R}{\omega\tau}\left\{\frac{\omega t}{2} - \frac{\left(\frac{\omega\tau}{2}\right)^3}{6} + \frac{\left(\frac{\omega\tau}{2}\right)^5}{120} - \ldots\right\}\right]$$

$$= R - \left\{R - \frac{R(\omega\tau)^2}{24} + \frac{R(\omega\tau)^4}{16 \times 120} - \ldots\right\}$$

$$= \frac{R(\omega\tau)^2}{24} - \frac{R(\omega\tau)^4}{16 \times 120} + \ldots$$

Neglecting terms from the second onward in Eq. (14) gives us:

$$\Delta R \approx \frac{R(\omega\tau)^2}{24} \tag{15}$$

$$\approx \frac{R}{24}\left(\frac{F}{R}\right)^2 \tau^2$$

$$\approx \frac{1}{24} \tau^2 \frac{F^2}{R}$$

This is one-twelfth (1/12) the error expressed in Eq. 6 for exponential-type acceleration/deceleration.

The foregoing is an embodiment in which the acceleration/deceleration characteristic is linear. However, with the acceleration/deceleration described hereinafter, it is possible to both diminish path error and obtain any acceleration/deceleration characteristic.

Figure 13:
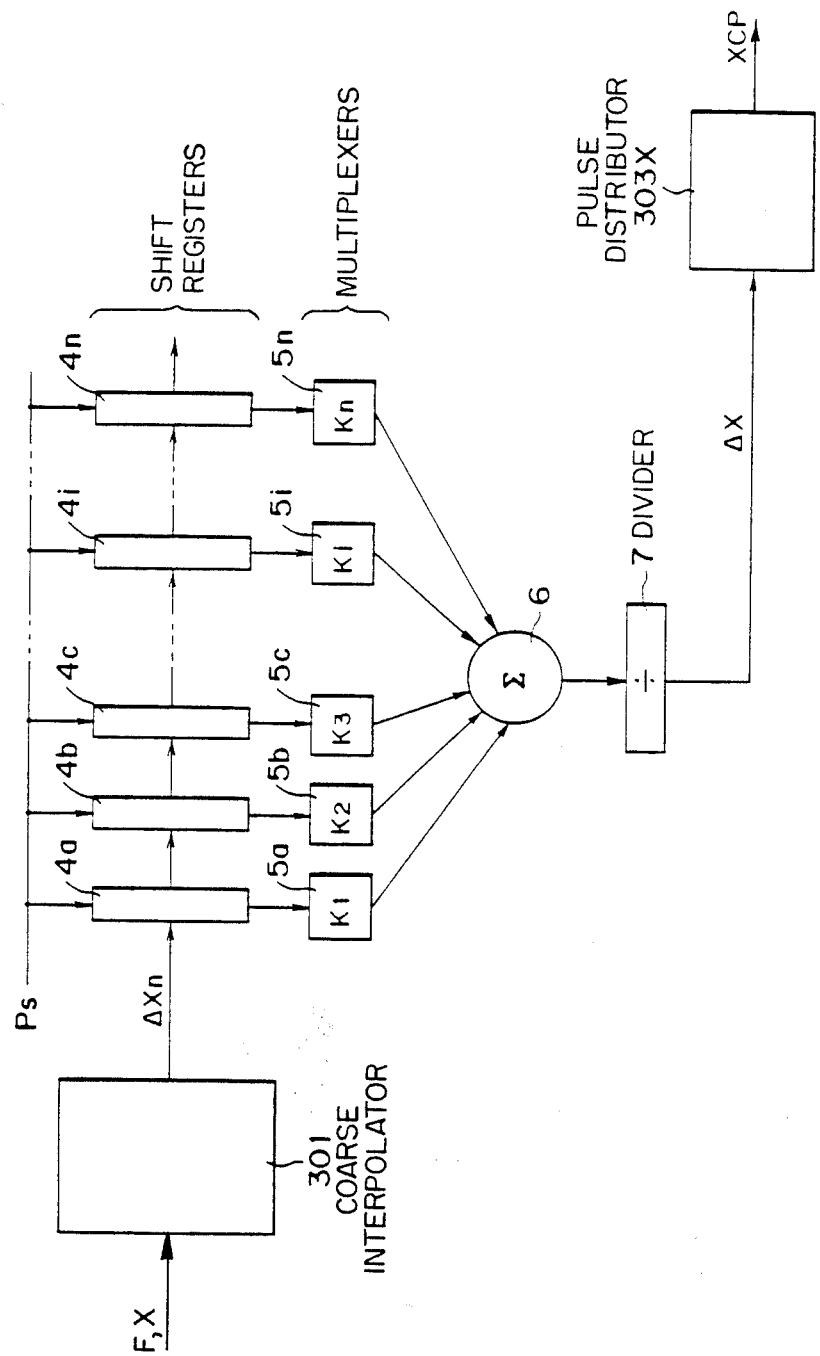
FIG. 13 is a block diagram of a second embodiment of the present invention.

FIG. 13 is a block diagram of a second embodiment of the present invention, in which details are shown solely with regard to X-axis components. Numeral 301 denotes a coarse interpolator which performs the operations of Eqs. (1) and (2) to generate coarse interpolation data (traveling distance components) $\Delta Xn$, $\Delta Yn$ along the respective axes whenever sampling is performed, the data being applied to an acceleration/deceleration circuit. Numerals 4a, 4b, . . . 4n denote shift registers each of which stores a traveling distance component $\Delta Xn$, with the traveling distance component being shifted from one shift register to the next in response to a shift pulse Ps. Numerals 5a through 5n denote multipliers for multiplying the data stored in the shift registers 4a through 4n by respective coefficients K1 through Kn, to which the multipliers have been set. Though the number n of shift registers is equal to $\tau/T$ (where $\tau$ is the time constant and T is the sampling period), n need not necessarily be made equal to $\tau/T$. Numeral 6 designates an adder for adding the results of the multiplication operations performed by the multipliers 5a through 5n. Numeral 7 denotes a divider for dividing the sum from the adder 6 by the sum of the coefficients K1 through Kn set in the respective multipliers 5a through 5n. Numeral 303X denotes the X-axis pulse distributor for producing distributed pulses; the number pulses corresponding to the result $\Delta X$ of the division performed by the divider 7.

Next, the operation of the embodiment shown in FIG. 13 will be described. The shift registers 4a through 4n are connected in series. In response to the shift pulse Ps, data is shifted successively from one shift register to the next. The latest traveling distance component $\Delta Xn$ produced by the coarse interpolator 301 each time sampling is performed is applied as an input to the shift register 4a. Accordingly, assuming that the contents of the shift registers 4a through 4n are A through N, respectively, the outputs of the multipliers 5a through 5n are A·K1 through N·Kn, respectively, at each sampling time, namely at the instant the traveling distance component $\Delta Xn$ is produced by the coarse interpolator 301. Consequently, the result XT of the addition performed by the adder 6 is expressed by the following equation:

$$XT = A\cdot K1 + B\cdot K2 + \ldots + N\cdot Kn \tag{16}$$

The result XT is divided by the divider 7 in accordance with the following equation to give a result XD:

$$XD = XT/KT \tag{17}$$

where $KT = K1 + K2 + \ldots + Kn = \frac{\text{time constant}}{\text{sampling period}}$ The result XD of the division is applied to the pulse distributor 303X, which functions as a fine interpolator, and produces distributed pulses XCP with controlled acceleration and deceleration.

When the shift pulse Ps arrives, the content of each shift register is shifted to the succeeding shift register. Further, the operations performed by the adder 6 and divider 7 are executed each time sampling is carried out.

The accelerating interval and decelerating interval of the acceleration/deceleration circuit are decided by the number of shift registers and the period of the shift pulses Ps. The period of the shift pulses Ps is equal to or less than the sampling pulse period.

Though the multipliers 5a through 5n, adder 6 and divider 7 constitute computing circuitry, these can be constructed by simple computing means, e.g., a microprocessor. If there is a problem in terms of computation time in connection with the sequential shifting of the shift registers, the shifting operation can be eliminated by adopting a buffer register construction and providing a pointer indicating which buffers are to produce A through N and which is to store $\Delta Xn$. Though not shown in FIG. 13, a separate accumulator, adder and computing circuit can be provided, as described above in connection with FIG. 12, in consideration of the fact that a remainder may be produced owing to the division performed by the divider 7. In such case, the remainder is summed every sampling period and the sum is accumulated in the accumulator. When the contents of the accumulator exceeds KT, 1 is added to the output value of the divider and the resulting value is delivered as the output of the acceration/deceleration circuit. Adopting this method makes highly precise acceleration and deceleration possible.

Figure 14A:
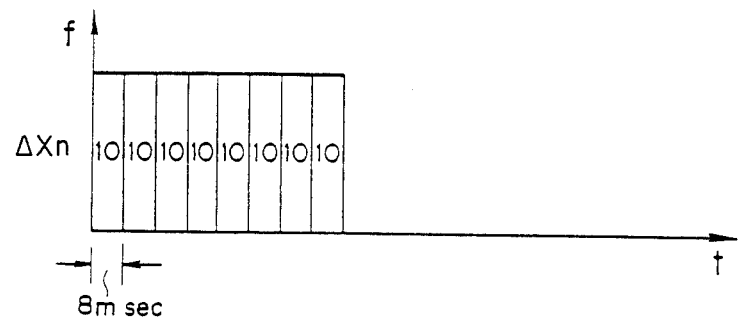
FIGS. 14A, 14B and 14C illustrate the second embodiment of the present invention.

Next, a specific embodiment of the present invention will be illustrated with reference to FIG. 14. We shall assume that the acceleration time constant is 40 msec, and that the sampling period T is 8 msec. Accordingly, the number of shift registers will be five ($=40/8$). Further, we shall assume that the input $\Delta Xn$ to the acceleration/deceleration circuit is 10, and that the initial value in each of the shift registers 4a through 4n is zero.

First, assume that the coefficients K1 through Kn of the multipliers 5a through 5n are all "1". At the first sampling instant, the result XT of performing Eq. (16) is 10 because $A=10$ and B through $N=0$. Therefore, the output $\Delta X$ of the divider 7 is 2.

At the second sampling instant, the result XT of performing Eq. (16) is 20 because A, $B=10$ and C through $N=0$. Therefore, the output $\Delta X$ of the divider 7 is 4.

Figure 14B:
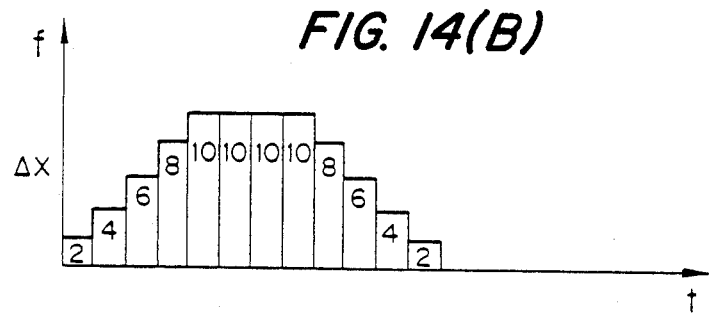
Figure 14C:
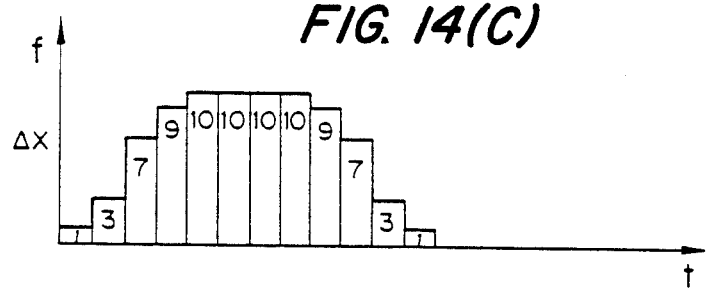

Thereafter, in similar fashion, the output $\Delta X$ of the divider increases to 6, 8 and 10. Upon passage of 40 msec, which is the time constant, the acceleration/deceleration circuit produces the numerical value 10 constantly until the arrival of $\Delta Xn$ ceases. When the latter occurs, the result Xt of performing Eq. (16) is 40 because $A=0$ and B through $N=10$. Hence, the output $\Delta X$ of the divider 7 is 8. Thenceforth, through a similar operation, the divider output $\Delta X$ decreases to 6, 4, 2 and 0, with zero being reached upon passage of the time constant of 40 msec. Accordingly, an acceleration/deceleration output XD of the kind shown in FIG. 14(B) is obtained, making it possible to achieve linear acceleration or deceleration over the time constant $\tau$ irrespective of the magnitude of a change in velocity.

In the above-described embodiment, the coefficients are all set to the same value. If the values of the coefficients are changed, however, a different acceleration/deceleration coefficient can be obtained. For example, in the foregoing embodiment, an acceleration/deceleration characteristic of the kind shown in FIG. 14(C) will be obtained by setting the coefficientts K1, K5 to 0.5, K2, K4 to 1.0, and K3 to 2.0.

Acceleration/deceleration characteristics can be selected in accordance with servo circuit and servomotor characteristics, and can be readily attained merely by setting the coefficients.

The first and second embodiments of the present invention achieve linear acceleration or deceleration within a certain period of time. The linearity is achieved irrespective of the magnitude of a change in velocity introduced to achieve a commanded velocity, and a path error along a circular arc can be made smaller than that obtained. In addition, since acceleration/deceleration control according to the invention can be carried out independently of interpolation, the acceleration/deceleration circutry is simple in construction. Furthermore, according to the second embodiment of the present invention, any acceleration/deceleration characteristic can be obtained. This makes it possible to set a characteristic best suited to the servo loop characteristic, and to carry out high speed positioning and high-speed cutting. The setting of an acceleration/deceleration characteristic can be achieved very easily merely by altering a multiplication coefficient. This is accomplished without an increase in the complexity of the arrangement which, as a result, is simple in construction.

The acceleration/deceleration circuit of the present invention is well-suited for driving, e.g., a movable element of a machine tool or a hand of a robot.

We claim:

1. An acceleration/deceleration circuit for raising or lowering a feed velocity of movable machine element having an axis of movement to achieve a commanded velocity, comprising:
   means for computing a traveling distance of the element along the axis for every sampling period (T);
   first storage means for storing n samples of the traveling distances where $n=\tau/T$, and $\tau$ is a time constant;
   arithmetic means for performing an operation:

$$\Delta Xn - \Delta Xo + St \rightarrow St$$

where $\Delta Xn$ represents the most recently computed traveling distance, $\Delta Xo$ represents the oldest computed traveling distance component among the traveling distances stored in said first storage means, and St represents the result of the operation, and for dividing the result St of the operation by n;
   second storage means for storing the result St; and
   means for providing St/n as an output corresponding to a traveling distance at a present sampling period.

2. An acceleration/deceleration circuit according to claim 1, further comprising:
   means for accumulating a remainder resulting from the division of St by n, and for adding 1 to said traveling distance at a present sampling when the accumulated remainders exceeds n.

3. An acceleration/deceleration circuit according to claim 1, wherein said machine element has a plurality of axes of movement and corresponding first storage means, second storage means and arithmetic means are provided for each axis.

4. An acceleration/deceleration circuit according to claim 1, wherein said first storage means comprises n shift registers.

5. An acceleration/deceleration circuit for raising or lowering a feed velocity of a machine element having an axis of movement to achieve a commanded velocity, comprising:
   means for computing a traveling distance of the element along the axis for every sampling period;
   storage means for storing n samples of the traveling distances; and
   computing means for multiplying each of the n samples of traveling distances stored in said storage means by a corresponding one of a set of coefficients, for adding the results of the multiplication operations, for dividing the result of the addition by the sum of said set of coefficients, and outputting the result of the division operation as a traveling distance at a present sampling period.

6. An acceleration/deceleration circuit according to claim 5, characterized in that the numerical value n is made equal to $\tau/T$, where $\tau$ is an acceleration/deceleration time constant.

7. An acceleration/deceleration circuit according to claim 6, characterized in that the sum of said coefficients is made equal to n.

8. An acceleration/deceleration circuit according to claim 5, wherein said storage means comprises n shift registers for storing respective ones of the traveling distances computed for corresponding sampling periods.

9. An acceleration/deceleration circuit according to claim 8, wherein said arithmetic means comprises n multipliers provided for corresponding shift registers, each multiplier multiplying the contents of said corresponding shift register by a coefficient.

10. An acceleration/deceleration circuit according to claim 7, further comprising means for accumulating a remainder resulting from dividing the result of the addition by the sum of said set of coefficients and for adding 1 to said traveling distance when the accumulated value exceeds the sum of said coefficients.

* * * * *

UNITED STATES PATENT AND TRADEMARK OFFICE
CERTIFICATE OF CORRECTION

PATENT NO.  : 4,554,497
DATED       : November 19, 1985
INVENTOR(S) : Nozawa et al.

It is certified that error appears in the above-identified patent and that said Letters Patent is hereby corrected as shown below:

```
Front page, [73] Assignee, after "Hino," insert --Tokyo,--.
Column 1, line 51, after "corresponds" insert --to--.
Column 2, line 15, delete "change".
Column 4, line 33, after "the" insert --coarse interpolation
     in the--;
          line 39, after "7" insert --illustrates the--;
          line 41, after "8" insert --illustrates--.
Column 5, line 24, "stores and" should be --and stores--;
          line 41, "12," should be --12 to--.
Column 9, line 38, "Xt" should be --XT--.
```

Signed and Sealed this

Eighteenth Day of March 1986

[SEAL]

Attest:

DONALD J. QUIGG

Attesting Officer

Commissioner of Patents and Trademarks